UNITED STATES PATENT OFFICE 1,963,100

LAURYL THIOCYANATE

Paul L. Salzberg and Euclid W. Bousquet, Wilmington, Del., assignors, by mesne assignments, to The Grasselli Chemical Company, Cleveland, Ohio, a corporation of Delaware No Drawing. Application December 29, 1932, Serial No. 649,450

9 Claims. (Cl. 260—98)

The present invention relates to lauryl thiocyanate and to processes of making this compound.

Lauryl thiocyanate is regarded as the lauryl ester of thiocyanic acid. Under present nomenclature it has the formula $$CH_3(CH_2)_{10}-CH_2-S-CN$$

It is a colorless liquid boiling at 154–156° C. under 2½ mm. pressure. It is substantially insoluble in water but soluble in the usual organic solvents, such as ethyl alcohol, aromatic and aliphatic hydrocarbons, etc. It has a faint but pleasant odor when highly purified.

Lauryl thiocyanate is remarkable due to its toxicity in very low concentrations toward lower forms of life, such as fungi and insects and can be used with advantage as a parasiticide.

We found that lauryl thiocyanate can be produced by reacting with a lauryl ester of an inorganic acid upon a salt of a thiocyanic acid. Particularly convenient for this purpose are the laurylhalides, laurylsulfates, phosphate, etc. and the ammonium or alkalimetal-thiocyanates.

Lauryl alcohol is converted to the chloride by passing hydrogen chloride through the alcohol containing 10% zinc chloride for 11 hours at 120–130° C. under atmospheric pressure. The reaction mixture is washed with water to remove zinc chloride and then washed with dilute sodium carbonate solution until neutral. The yield of chloride is 92% based on the chlorine analysis of the crude product. On redistilling the crude material one obtains a product boiling at 113–115° C. under 5 mm. pressure.

Lauryl thiocyanate is obtained in about 95% yield by heating a 20% ethyl alcohol solution of lauryl chloride with a 10% excess of sodium thiocyanate for 8 hours at 125° C. in a closed vessel. Stirring increases the rate of reaction. The reaction mixture is filtered to remove sodium chloride and the alcohol is then recovered by distillation leaving the lauryl thiocyanate which is washed with water to remove unreacted sodium thiocyanate.

For purification we fractionally distill this crude material.

If lauryl bromide is used instead of the chloride, the reaction with the thiocyanate proceeds rapidly at the boiling point of ethyl alcohol at ordinary pressures.

The reaction of the lauryl halides with the thiocyanates can be accelerated by the use of catalysts, such as finely divided copper.

Instead of using a common solvent for the halogenid and the thiocyanater we can also effect the reaction in an aqueous medium in which the halogenid has been finely dispersed.

The halides in the above reaction can be replaced by, for instance, sodium lauryl sulfate or other lauryl esters of inorganic acids and the same thiocyanate is obtained.

Another method of making lauryl thiocyanate consists in reacting with cyanogen chloride upon a lauryl mercaptide, such as for instance lead mercaptide:

$$(CH_3(CH_2)_{10}-CH_2-S)_2Pb.$$

Instead of using pure lauryl alcohol as the starting material for our novel lauryl thiocyanate we can also submit a crude product to the above reactions. Such a crude product is for instance, obtained by the hydrogenations of vegetable oils, such a coconut oil or the corresponding free fatty acids. This crude product consists predominantly of lauryl alcohol with small amounts of octyl, decyl, tetradecyl alcohols and other homologues.

When converting the alcohols in such a mixture into the alkyl thiocyanates by the above reactions we obtain a mixture of alkyl thiocyanates in which the lauryl thiocyanate predominates, besides small amounts of octyl, decyl, tetradecyl thiocyanates. This mixture is a liquid of high boiling point of properties similar to those of the straight lauryl thiocyanate and can be substituted for the same product in many of its uses.

We claim:

1. Lauryl thiocyanate corresponding to the formula $$CH_3(CH_2)_{10}CH_2-S-CN.$$

2. Lauryl thiocyanate which boils at about 154–156° C. under 2½ mm. pressure, which is substantially insoluble in water but soluble in ethyl alcohol and which is toxic against lower forms of life.

3. A mixture of alkyl thiocyanates consisting predominantly of lauryl thiocyanate with smaller amounts of homologous thiocyanates.

4. A process of making lauryl thiocyanate which comprises reacting a salt of thiocyanic acid with a lauryl ester of an inorganic acid.

5. A process of making lauryl thiocyanate which comprises reacting an alkali metal thiocyanate with a lauryl halide.

6. The process of making lauryl thiocyanate which comprises reacting sodium thiocyanate with lauryl chloride.

7. The process of making lauryl thiocyanate which comprises reacting sodium thiocyanate with lauryl chloride in an ethyl alcoholic medium under super atmospheric pressure.

8. The process of making lauryl thiocyanate which comprises heating sodium thiocyanate with lauryl chloride for about 8 hours in an ethyl alcoholic medium at a temperature of about 125° C. and under super atmospheric pressure.

9. The process of making a mixture of alkyl thiocyanates which comprises reacting a salt of thiocyanic acid with inorganic esters of a crude hydrogenation product of vegetable oils, said hydrogenation product consisting predominantly of lauryl alcohol with small amounts of octyl, decyl, tetradecyl and other homologous alcohols.

PAUL L. SALZBERG.
EUCLID W. BOUSQUET.